United States Patent
Tukamoto et al.

(10) Patent No.: US 7,122,960 B2
(45) Date of Patent: Oct. 17, 2006

(54) EMISSION DEVICE FOR AN ULTRA-HIGH PRESSURE MERCURY LAMP

(75) Inventors: Takuya Tukamoto, Himeji (JP); Yoshikazu Suzuki, Yokohama (JP); Tomoyoshi Arimoto, Tatuno (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 284 days.

(21) Appl. No.: 10/792,766

(22) Filed: Mar. 5, 2004

(65) Prior Publication Data

US 2004/0178733 A1    Sep. 16, 2004

(30) Foreign Application Priority Data

Mar. 13, 2003  (JP) ............... 2003-067477
Dec. 16, 2003  (JP) ............... 2003-417420

(51) Int. Cl.
*H01J 17/20* (2006.01)
(52) U.S. Cl. ............ 313/576; 313/578; 313/579; 313/620
(58) Field of Classification Search .......... None
See application file for complete search history.

(56) References Cited

U.S. PATENT DOCUMENTS

| 5,109,181 | A | 4/1992 | Fischer et al. |
| 5,497,049 | A | 3/1996 | Fischer |
| 5,608,294 | A | 3/1997 | Derra et al. |
| 6,215,252 | B1 | 4/2001 | Stanton |
| 6,504,323 | B1 | 1/2003 | Yuda et al. |
| 6,545,430 | B1 | 4/2003 | Ono et al. |
| 6,590,348 | B1 | 7/2003 | Takahashi et al. |
| 6,593,692 | B1 * | 7/2003 | Kitahara et al. ............ 313/571 |
| 2003/0080693 | A1 * | 5/2003 | Ono et al. ................... 315/224 |
| 2003/0184230 | A1 * | 10/2003 | Nishida ...................... 313/639 |

* cited by examiner

*Primary Examiner*—Tuyet Thi Vo
(74) *Attorney, Agent, or Firm*—David S. Safran

(57) ABSTRACT

An emission device for an ultra-high pressure mercury lamp which maintains an electrode tip shape by which a stable discharge can always be carried out is achieved for a short arc ultra-high pressure mercury lamp with silica glass arc tube containing a pair of opposed electrodes spaced apart a distance of at most 2 mm and in which the arc tube is filled with at least 0.15 mg/mm$^3$ of mercury, a rare gas and a halogen in the range from $1\times10^{-6}$ μmole/mm$^3$ to $1\times10^{-2}$ μmole/mm$^3$; by providing an operating device which produces a current feed by which the surface of the tip of at least one of the electrodes is shifted into a molten state during lamp operation.

12 Claims, 8 Drawing Sheets

EMISSION DEVICE FOR AN ULTRA-HIGH PRESSURE MERCURY LAMP

BACKGROUND OF THE INVENTION

1. Field of the Invention

The invention relates to an emission device for an ultra-high pressure mercury lamp. The invention relates especially to an emission device which is used for a liquid crystal display device with a light source which is a short arc ultra-high pressure mercury lamp in which an arc tube is filled with at least 0.15 mg/mm$^3$ of mercury, and in which the mercury vapor pressure during operation is at least 110 atm, and for a projector device such as a DLP (digital light processor) or the like using a DMD (digital micro mirror device).

2. Description of the Prior Art

In a display device of the projection type, there is a demand for illumination onto an image device in a uniform manner, and moreover, with adequate color rendering. Therefore, the light source is a metal halide lamp which is filled with mercury and a metal halide. Furthermore, recently smaller and smaller metal halide lamps and more and more often point light sources are being produced and metal halide lamps with extremely small distances between the electrodes are being used in practice.

Against this background, instead of metal halide lamps, lamps with an extremely high mercury vapor pressure, for example, with 150 atm, have been recently proposed. Here, the broadening of the arc is suppressed (the arc is compressed) by the increase of the mercury vapor pressure and moreover a great increase of the light intensity is the goal.

These ultra-high pressure discharge lamps are disclosed, for example, in Japanese patent disclosure document HEI 2-148561 (U.S. Pat. No. 5,109,181) and Japanese patent disclosure document HEI 6-52830 (U.S. Pat. No. 5,497,049).

For the above described lamp, for example, a short arc ultra-high pressure mercury lamp is used in which in the silica glass arc tube there is a pair of opposed electrodes with tungsten as the main component and spaced apart by a distance of at most 2 mm. This arc tube is filled with at least 0.15 mg/mm$^3$ of mercury and also contains an amount of halogen in the range from $1\times10^{-6}$ μmole/mm$^3$ to $1\times10^{-2}$ μmole/mm$^3$. The main purpose of adding the halogen is to prevent devitrification of the arc tube. However, the so-called halogen cycle also arises as a result.

In the above described ultra-high pressure mercury lamp (hereinafter also called only a "discharge lamp") the phenomenon occurs that, in the course of operation, tungsten is deposited on the electrode tips, that the electrode tips deform and that projections form. This phenomenon is not entirely clear, but the following can be assumed.

The tungsten which is vaporized from the high temperature area in the vicinity of the electrode tip during lamp operation combines with the halogen and residual oxygen which are present in the arc tube. In the case, for example, that bromine (Br) is added as the halogen, it is in the form of a tungsten compound such as WBr, WBr$_2$, WO, WO$_2$, WO$_2$Br, WO$_2$Br$_2$ or the like. These compounds decompose in the high temperature area in the gaseous phase in the vicinity of the electrode tips and yield tungsten atoms or tungsten cations. Due to thermal diffusion (diffusion of the tungsten atoms which are moving from the high temperature area in the gaseous phase (=arc center) in the direction toward the low temperature area (=vicinity of the electrode tip)), due to concentration diffusion and due to the fact that in the arc the tungsten atoms are ionized, yield cations and during operation of the electrode as a cathode are pulled (drift) by the electric field in the direction to the cathode, the tungsten vapor density in the gaseous phase in the vicinity of the electrode tip becomes high, by which deposition on the electrode tip takes place and the electrode tips deform, or by which projections are formed. The circumstances of the above described projections are disclosed, for example, in Japanese patent disclosure document 2001-312997 (U.S. Pat. No. 6,545,430).

FIG. 9 schematically shows the electrode tips and projections. In the figure, the each of the electrodes 1 has a spherical part 1a and a shaft 1b. On the tip of the spherical part 1a, a projection 2 is formed. In the case in which, at the start of lamp operation, there is no projection, projections 2 are also produced by subsequent operation, as is shown in FIG. 9. An arc discharge A is formed on these projections 2 as the starting points.

In this case, if the above described projections are formed in ideal form, there is no disadvantage. However, since they form, as was described above, in the course of operation of the discharge lamp by a physical phenomenon, they do not always have an ideal shape. Especially in the case in which they have a crooked shape, such as showing asperity, the starting point of the discharge becomes unstable, which causes the serious disadvantage that, in the case of a light source of a projector device which is designed such that a point light source is assumed, light cannot emerge to a sufficient degree. Similar disadvantages also arise.

SUMMARY OF THE INVENTION

A primary object of the present invention is to devise an emission device for an ultra-high pressure mercury lamp with an electrode tip shape in which a stable discharge can always be carried out.

This object is achieved according to a first aspect of the invention in an emission device for an ultra-high pressure mercury lamp which comprises:

a short arc ultra-high pressure mercury lamp in which, in the silica glass arc tube, there is a pair of opposed electrodes, with tungsten as the main component, that are spaced from each other by a distance of at most 2 mm and the tube is filled with at least 0.15 mg/mm$^3$ of mercury, rare gas and from $1\times10^{-6}$ μmole/mm$^3$ to $1\times10^{-2}$ μmole/mm$^3$ of a halogen, and an operating device that shifts the surface of the tip area of at least one of the electrodes into a molten state during lamp operation.

Furthermore, the object is achieved according to a development of the invention in an emission device for an ultra-high pressure mercury lamp in that the operating device is made to supply to a short arc ultra-high pressure mercury lamp an alternating lamp current which superimposes a high pulse immediately after polarity inversion.

Furthermore, the object is achieved according to a development of the invention in an emission device for an ultra-high pressure mercury lamp in that the alternating lamp current which is supplied by the operating device to the short arc ultra-high pressure mercury lamp increases toward the last half of the half-period.

Still further, the object is achieved according to a development of the invention in an emission device for an ultra-high pressure mercury lamp in that the alternating lamp current which is supplied by the operating device to the short arc ultra-high pressure mercury lamp gradually decreases after superposition of a high pulse and afterwards gradually increases starting with the last half of the half-period.

Additionally, the object is achieved according to a development of the invention in an emission device for an ultra-high pressure mercury lamp in that for the alternating lamp current which is supplied by the operating device to the short arc ultra-high pressure mercury lamp, the current value decreases after superposition of a high pulse in the entire duration of this half-period.

Furthermore, the object is achieved according to a development of the invention in an emission device for an ultra-high pressure mercury lamp in that at least one of the electrodes of the ultra-high pressure discharge lamp has a part formed on the shaft with a greater diameter, a projection which is formed on the tip of this part with a greater diameter, and a part with a decreasing diameter which is formed from the part with the greater diameter in the direction to the projection.

Furthermore the object is achieved according to a development of the invention in an emission device for an ultra-high pressure mercury lamp in that the tip of the projection is roughly hemispherical.

In addition, the object is achieved, according to a second aspect of the invention, in an ultra-high pressure mercury lamp of the alternating operation type in which in the silica glass arc tube there is a pair of opposed electrodes at a distance from each other of at most 2 mm and the tube is filled with at least 0.15 mg/mm$^3$ of mercury, rare gas and an amount of halogen in the range of $1 \times 10^{-6}$ μmole/mm$^3$ to $1 \times 10^{-2}$ μmole/mm$^3$, in that the surface of the tip area of at least one of the electrodes is shifted into the molten state during lamp operation.

As was described above, in the emission device of the invention for an ultra-high pressure discharge lamp, for the half period of an alternating current immediately after polarity switching, a high pulse current is superimposed. The surface of the electrode tip area of the discharge lamp is therefore shifted into a molten state at least for each switching into operation as an anode (electrode operation as an anode). In this way, the formation of an undesirable shape, such as an asperity formation on the surface of the electrode tip area or the like can be prevented.

The invention is described in detail below with reference to the accompanying drawings.

DETAILED DESCRIPTION OF THE INVENTION

Figure 1:
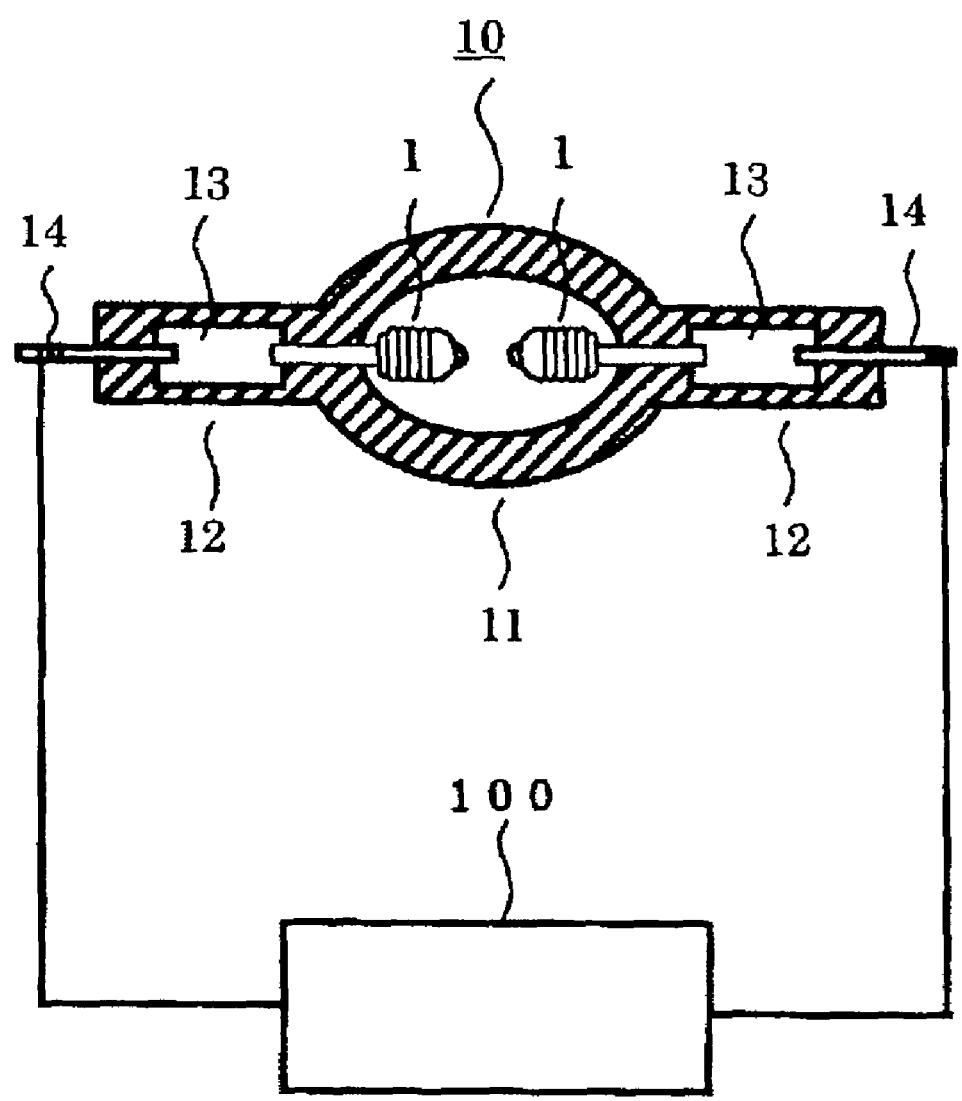
FIG. 1 is a schematic depiction of a ultra-high pressure mercury lamp in accordance with the invention.

FIG. 1 schematically shows essentially the entire arrangement of the emission device of the invention for an ultra-high pressure mercury lamp. The emission device has a short arc ultra-high pressure mercury lamp 10 (hereinafter also called only a "discharge lamp") and an operating device 100.

In the figure, the discharge lamp 10 has an essentially spherical discharge vessel 11 which is formed by a silica glass. In this discharge vessel 11, there is a pair of opposed electrodes 1 which have tungsten as their main component. From the two ends of the discharge vessel 11, there extend hermetically sealed portions 12 in which, normally, a molybdenum conductive metal foil 13 is hermetically installed, for example, by a shrink seal. For each of the electrodes 1, the shaft is electrically connected to a metal foil 13 by welding. An outer lead 14, which projects to the outside, is welded to the other end of the respective metal foil 13. The outer lead 14 is connected to the operating device 100.

The discharge vessel 11 is filled with mercury, a rare gas and a halogen gas. The mercury is used to obtain the required wavelength of visible radiation, for example, to obtain radiant light with wavelengths from 360 nm to 780 nm, and is added in an amount of at least 0.15 mg/mm$^3$. With this amount of mercury added, depending on the temperature condition, an extremely high vapor pressure of at least 150 atm is achieved during operation. By adding a larger amount of mercury, a discharge lamp with a high mercury vapor pressure during operation of at least 200 atm or 300 atm can be produced. The higher the mercury vapor pressure, the more suitable the light source which can be implemented for a projector device.

As the rare gas, for example, roughly 13 kPa of argon gas is added, by which the ignitability is improved.

The halogens can be iodine, bromine, chlorine and the like in the form of a compound with mercury or other metals. The amount of halogen added is selected from the range from 10$^{-6}$ μmol/mm$^3$ to 10$^{-2}$ μmol/mm$^3$. The halogen is intended to prolong the service life using the halogen cycle. For an extremely small discharge lamp with a high internal pressure, such as in the discharge lamp of the invention, the main purpose adding a halogen is to prevent devitrification of the discharge vessel.

The numerical values of the discharge lamp are shown by way of example below:

The maximum outside diameter of the discharge vessel is in the range from 8 mm to 12 mm and is, for example, 10 mm;

the distance between the electrodes is in the range from 0.5 mm to 2.0 mm and is, for example, 1.0 mm; and the inside volume of the arc tube is in the range from 50 mm$^3$ to 120 mm$^3$ and is, for example, 65 mm$^3$.

The discharge lamp is operated by the operating device 100 in the range from 50 Hz to 700 Hz, for example, 150 Hz, and with a rated voltage of 80 V and a rated wattage of 200 W using an alternating current.

Such a discharge lamp is installed in a projector device which is as small as possible. Since, on the one hand, the overall dimension of the device is extremely small and since, on the other hand, there is a demand for high light intensity, the thermal influence in the arc tube portion is extremely strict. The value of the wall load of the lamp is 0.8 W/mm² to 2.0 W/mm², specifically 1.5 W/mm².

That the lamp has such a high mercury vapor pressure and such a high value of the wall load leads to the fact that it can offer radiant light with good color rendering if it is installed in a projector device or a presentation apparatus, such as an overhead projector or the like.

Figure 2:
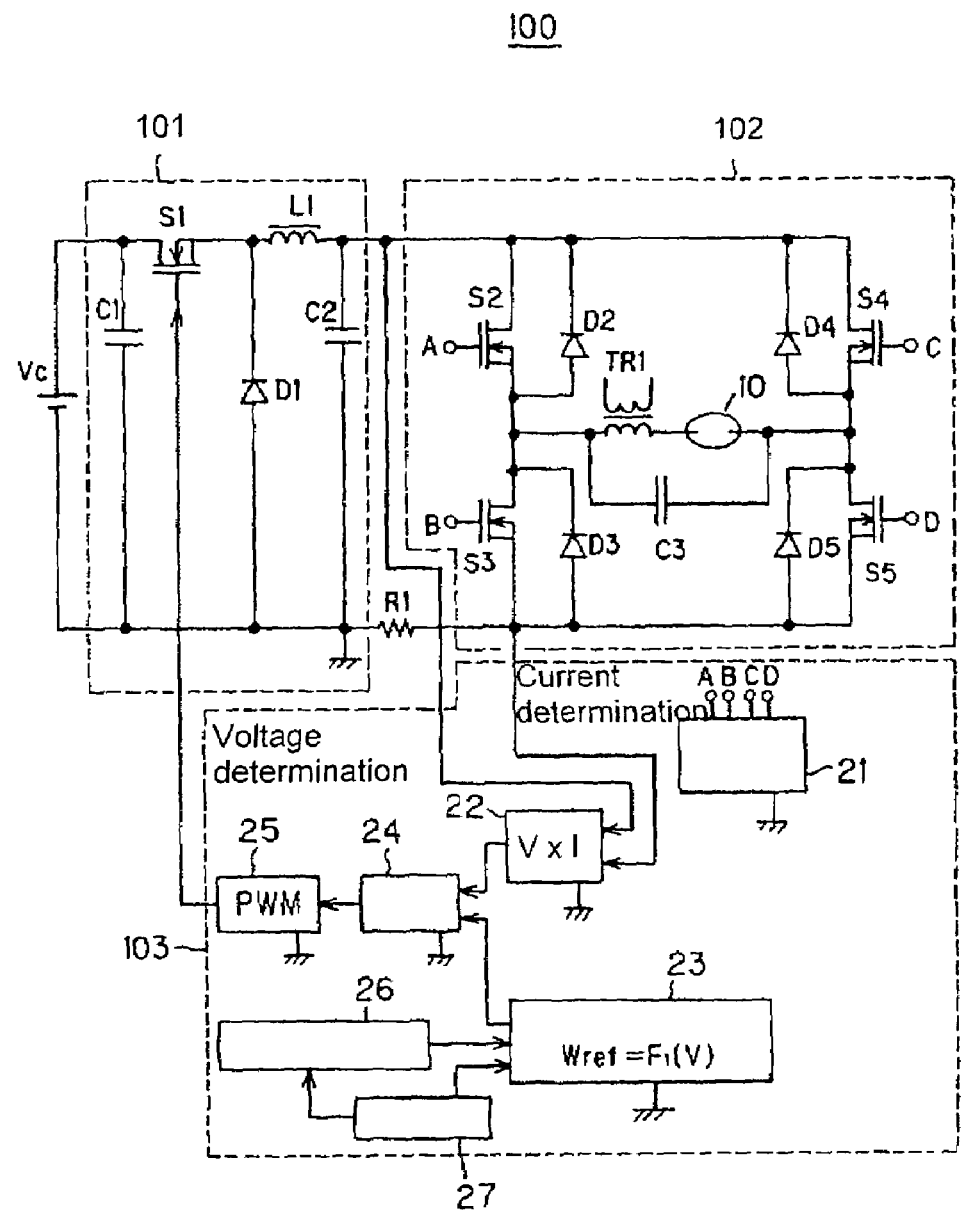
FIG. 2 is a circuit diagram of an operating device for the emission device for an ultra-high pressure mercury lamp of the invention.

FIG. 2 shows an example of an arrangement for the operating device 100. In particular, operating device 100 comprises a switching regulation part 101, a full bridge circuit 102 and a control element 103 which controls this switching regulation part 101 and this full bridge circuit 102. The full bridge circuit 102 is comprised of switching devices S2 to S5 which convert the direct current power of the switching regulation part 101 into alternating current power with rectangular waves. The switching regulation part 101 controls the power by pulse-width control of the switching device S1.

A transformer TR1 for an igniter is connected in series connection with the discharge lamp 10. A capacitor C3 is connected in series connection with the discharge lamp 10 and the transformer TR1. An alternating current with a low frequency is supplied from the full bridge circuit 102 to the series connection of the discharge lamp 10 and the transformer TR1, and thus, the discharge lamp is operated. Furthermore, an outer trigger system in which the igniter is separated from the power feed part can also be used, for example, as described in the Japanese patent disclosure document 2003-17283 (corresponding to co-pending U.S. patent application Ser. No. 10/183,446) of the assignee of the present application.

The switching regulation part 101 comprises a capacitor C1, the switching device S1 which carries out switching operation by the output of the control element 103, a diode D1, an inductance L1, and a smoothing capacitor C2. The ON/OFF ratio of the switching device S1 is controlled by a PWM (pulse width modulation) part 25 of the control member 103. Thereby the wattage supplied to the discharge lamp 10 via the full bridge circuit 102 (discharge power) is controlled.

To determine the current which is supplied to the discharge lamp 10 from the switching regulation part 101, there is a resistor R1 for determining the current between the switching regulation part 101 and the full bridge circuit 102.

The full bridge circuit 102 comprises the switching devices S2 to S5 which are formed by a transistor or a FET which is connected in a bridge-like manner, and of diodes D2 to D5 which are connected anti-parallel to the switching devices S2 to S5. The switching devices S2 to S5 are driven by a full bridge driver circuit 21 which is located in the control element 103. The discharge lamp 10 is operated by supplying an alternating current with a low frequency to the discharge lamp 10.

This means that the switching devices S2, S5 and the switching devices S3, S4 are turned on in alternation, and low frequency alternating current is supplied to the discharge lamp in the line path switching regulation part 101->switching device S2->discharge lamp 10->switching device S5->switching regulation part 101 and in the line path switching regulation part 101->switching device S4->discharge lamp 10->switching device S3->switching regulation part 101, and the discharge lamp is operated.

The control element 103 has a full bridge driver circuit 21 which produces driver signals for the switching devices S2 to S5.

The determined value of the current and the determined value of the voltage of the discharge lamp 10 are input into a multiplication device 22 by which the operating wattage is computed. Control with feedback is carried out by a comparator 24 comparing the signals from a reference wattage-signal generator 23.

General control for normal operation of the discharge lamp was shown above.

As is described later, signals from a superimposed high pulse circuit 26 are transmitted to the reference wattage signal generator 23, by which high pulses are superimposed. Moreover, signals from the light control circuit 27 are transmitted to the superimposed high pulse circuit 26 and the reference wattage signal generator 23. Furthermore, information such as the light control mode and the like is transmitted to the light control circuit 27 from the main part of the projector device.

Figure 3A:
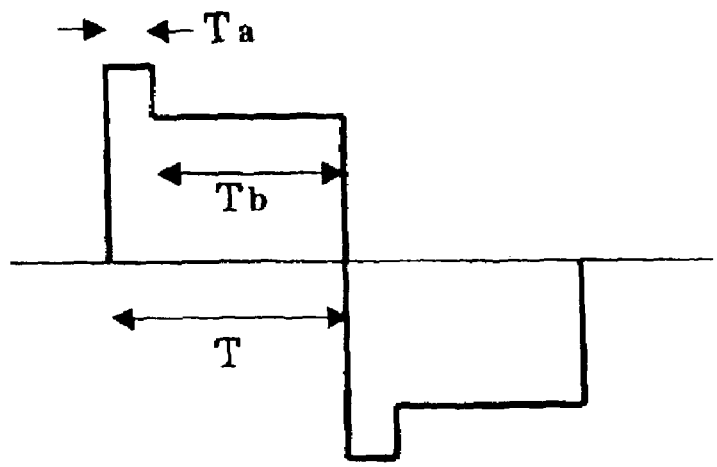
FIGS. 3(*a*) to 3(*c*) each show a plot of the current waveform of the ultra-high pressure mercury lamp of the invention.
Figure 3B:
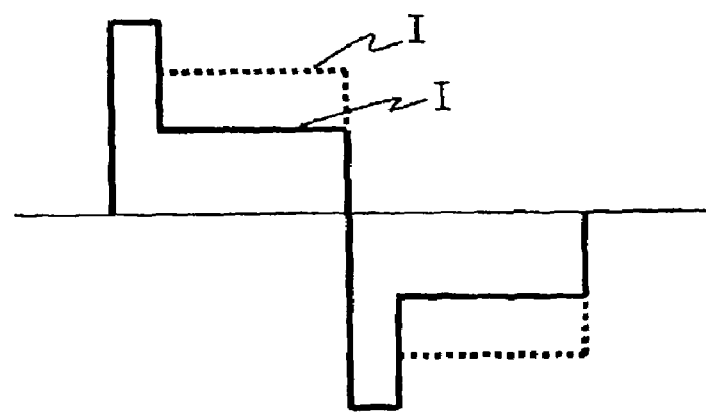
Figure 3C:
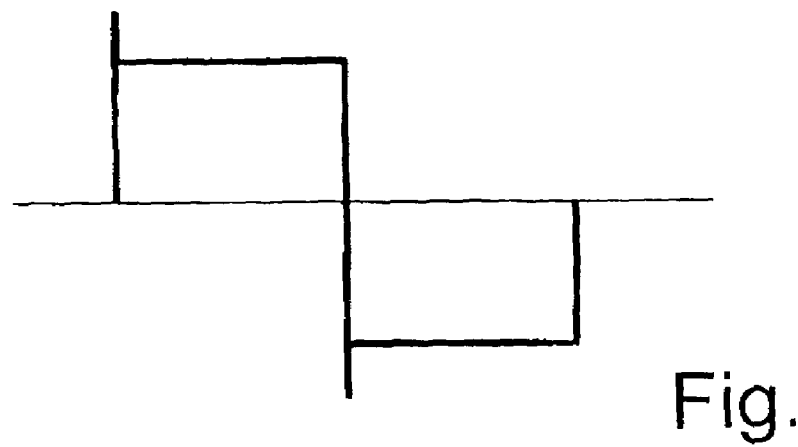

FIGS. 3(a) to 3(c) each show the alternating current waveform of the discharge lamp. In FIGS. 3(a) to 3(c), the y-axis plots the current value and the x-axis plots the time. FIG. 3(a) shows an elementary current waveform of the invention. For the alternating current supplied to the discharge lamp 10 from the operating device 100 in a time interval Ta immediately after a polarity reversal, a high pulse current is superimposed. In a following interval Tb, the superposition is avoided. By this superposition of a high pulse current, at least the surface area is shifted into the molten state. Therefore, a stable discharge can be carried out without asperity or a crooked shape forming on the electrode tip by deposition of tungsten.

In accordance with the invention, in each half period in which one of the electrodes is operated as an anode, in which the temperature becomes high, at least the tip area surface of the anode mode electrode is melted. By producing a molten state for each period, the formation of asperity or a crooked shape can be prevented even if asperity and a crooked shape were to form during lamp operation in the electrode tip area. For superposition of the pulse current, therefore, at least for the half period of this operation as the anode, a current value and an interval are required for which the tip surface of the projection can be melted.

In an embodiment of the above described discharge lamp, the numerical values are shown by way of example below.

The half period T is 10 ms (50 Hz) to 0.7 ms (700 Hz);
the interval Ta is roughly ½ to ⅕ of a half period T;
the current value during the interval Ta is 2.5 a to 3.0 A; and
the current value during the interval Tb is 1.8 A to 2.5 A.

FIG. 3(b) shows a current waveform in the case of a change of the current value for light control in the ultra-high pressure mercury lamp of the invention. The concept of "light control" is defined as control of the increase or decrease of the amount of current of the discharge lamp in the case of a change of the brightness of the projector device for different purposes. In FIG. 3(b), the current value I' during an interval Tb is lower than the reference current value I. By this change of the current value I', light control is carried out. However, since during the interval Ta it is necessary to melt the surface of the projection, the current value cannot be changed according to the light control. In the interval Tb, for purposes of light control, the current value can be changed in a suitable manner. However, in the interval Ta, it is necessary for purposes of surface melting of the electrode tip area that a high pulse current always be superimposed. It is this point which is an important feature of the invention.

The numerical values are shown by way of example below.

The current value I' during light control is roughly 1/1.1 to 1/1.3 of the reference current value I. Specifically, the average of the light control current in the case of a reference current value, for example, of 2.5 A is 1.9 A to 2.3 A.

FIG. 3(c) shows a current waveform in the case in which the interval Ta with respect to a half period is relatively short. Here, it is shown specifically that, in the case in which during interval Tb a current value which is to a certain extent high is supplied, the energy (time and amount of current) of the pulse superimposed during the interval Ta can be set low. The reason for this is that, during the interval Tb, the current supplied from the operating device contributes to melting of the electrode tip area.

On the other hand, for example, in the case of a low current value during the interval Tb, as is shown in FIG. 3(b), during the interval Ta, energy must be supplied by which the molten state can be maintained even during the interval Tb.

This means that immediately after a polarity reversal, it is necessary to superimpose a high pulse current to start the melting of the surface of the electrode tip area. The time for this and the current value can also be selected in a suitable manner in view of the current value during the following interval Tb. If the operating device receives information about the current which is to be supplied in the time interval Tb, by receiving information about the situation of use from the projector device, it therefore selects the time interval Ta and the current value according to this current value. This operation means that, in the circuit diagram shown in FIG. 2, the superimposed high pulse circuit 26 and the light control circuit 27a are connected to one another. By detecting whether the projector device is in a light control mode or a non-light control mode or which level of light control is present in the case of the light control mode, the amount of energy which is to be supplied during the interval Ta is adjusted. In reality, some part of the control element 103 involves a computer function and assumes this control function.

Especially with consideration of the life time of the discharge lamp and the voltage tolerance of the operating device, it is desirable to achieve melting of the surface of the electrode tip area with minimum energy. It is desirable that the supply of the high current pulse take place, as much as possible, with a low current value or a short interval as long as a molten state can only just be achieved.

The numerical values of a general light control mode of the projector device are shown below by way of example.

In the case of a rated wattage of the discharge lamp of, for example, 200 W, light control in the range from 160 W to 180 W is carried out. This light control is carried out, for example, in the case in which very great brightness is not needed when using a projector in a small room, and furthermore, in the case that the projector is to be used with a low noise by the cooling fan, or in similar cases.

Figure 4A:
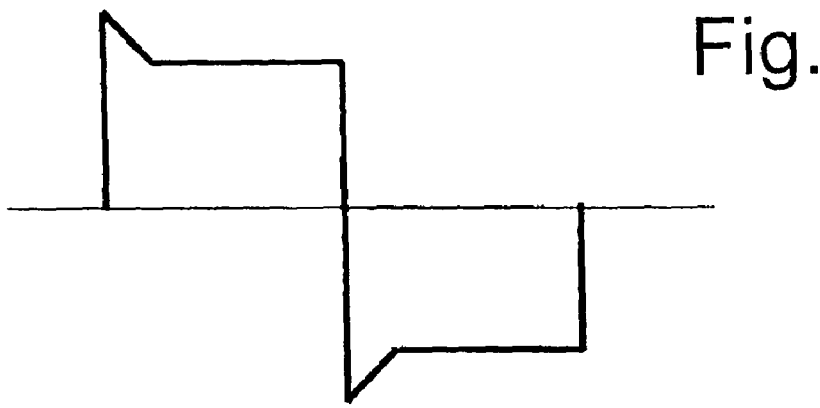
FIGS. 4(*a*) to 4(*c*) each show a plot of the current waveform of the ultra-high pressure mercury lamp in accordance with another aspect of the invention.
Figure 4B:
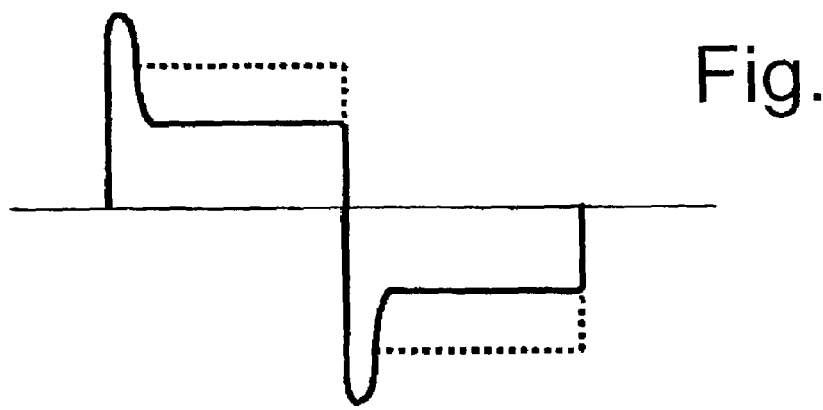
Figure 4C:
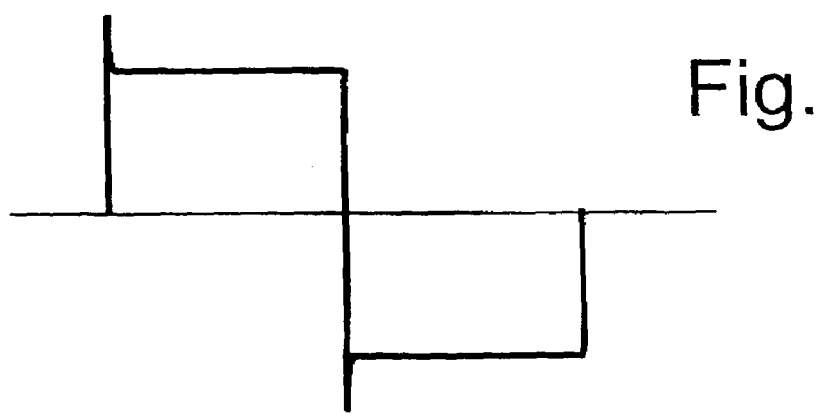

FIGS. 4(a) to 4(c) each show one version of a high current pulse waveform. In FIGS. 4(a) to 4(c), as in FIGS. 3(a) to 3(c), the y-axis plots the current value and the x-axis plots the time. FIG. 4(a) shows a waveform in which a high current pulse is gradually reduced linearly. FIGS. 4(b) and 4(c) each show a waveform in which a high current pulse is gradually reduced in a curve-like manner.

Because the pulse current which has been superimposed in this way does not quickly diminish afterwards, as a rectangular pulse does, but it continuously decreases, the heating of the projection on the electrode tip in anode operation, at least for each individual period, can be regulated and the degree of melting of the electrode tip surface can be controlled. Since a waveform which changes continuously in this way can reduce the fluctuation of the light intensity according to the current change, it has the effect of reducing the flickering of the image in the case of use for a projector device.

This current waveform is especially well suited in a light reduction mode. The reason for this is that the current value during the interval Tb is small and therefore the change with respect to the peak value during the interval Ta is increased.

The shape of the pulse is not limited to the waveform which is shown above using FIGS. 4(a), 4(b) and 4(c). If in practice no disadvantages occur, a process is possible in which the amount of current is incrementally reduced or a process is possible in which the amount of current is gradually or incrementally increased and afterwards decreased.

Figure 5A:
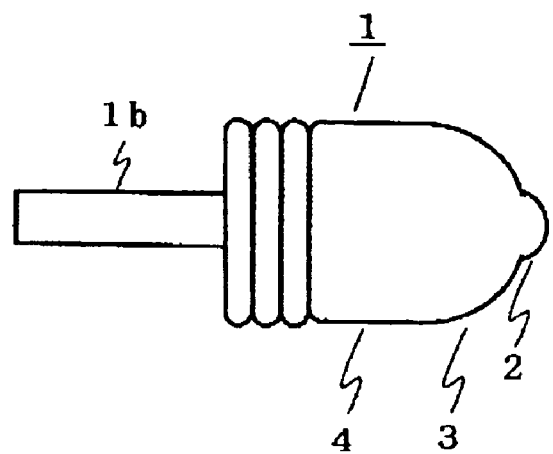
FIGS. 5(*a*) and 5(*b*) each show a schematic of an electrode of an ultra-high pressure mercury lamp of the invention.
Figure 5B:
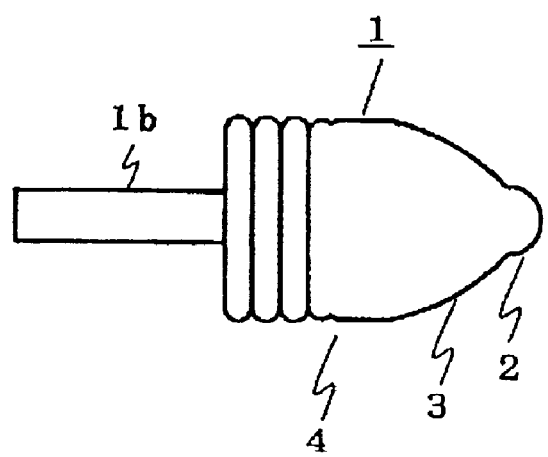

FIGS. 5(a) and 5(b) each show an enlarged view of the electrode 1. FIG. 5(a) shows an electrode with an essentially spherical tip of the part with a larger diameter. FIG. 5(b) shows an electrode in which the tip of the part with a larger diameter has a part with a decreasing diameter. Both in FIG. 5(a) and also in FIG. 5(b), the electrode 1 has a projection 2, a part with a decreasing diameter 3, a part with a larger diameter 4 and a shaft 1b. In FIG. 5(a), a projection 2 is formed on the tip of the part with the larger diameter 4.

The projection 2, as was described above, is formed in the course of operation and arises by the accumulation of tungsten atoms or the like for a characteristic configuration in which the distance between the electrodes is at most 2 mm and in which the arc tube is filled with at least 0.15 mg/mm$^3$ of mercury, rare gas and an amount of halogen in the range from $1\times10^{-6}$ μmole/mm$^3$ to $1\times10^{-2}$ μmole/mm$^3$. The projection 2, during lamp operation, becomes the arc start point and can stably maintain the arc position. Thus, the fluctuation of the arc, such as an arc jump or the like, can be prevented. There are many cases in which the projection 2 has an essentially spherical shape.

The part with the larger diameter 4 is formed, for example, by melting of filamentary tungsten which is wound in the manner of a coil. The melting takes place by TIG welding or laser irradiation. There is a case in which on the back end a coil part remains, as is shown in the drawings. This coil part acts as the starting position and simplifies the breakdown when operation is started by the asperity effect of the surface. Moreover, it has the function of heat radiation by the asperity effect of the surface. Since the coil is thin, it is easily heated, by which it also has the function of accelerating the transition from a glow discharge into an arc discharge. The part with a decreasing diameter 3 is formed by melting of the coil on the tip of the part with the greater diameter 4. The average grain size of the tungsten crystal in the tip area of the part with the decreasing diameter 3 is at least 50 microns.

One important feature of the invention is that at least the tip surface of the projection 2 is shifted into the molten state during lamp operation, specifically that the surface of the projection is melted by the above described measure that a high current pulse is superimposed immediately after polarity switching for each half period of the alternating current which is supplied from the operating device, at least for operation as the anode. The reason for this is the following:

Since the projection 2 in the course of operation forms as a natural phenomenon, there are many cases in which it has an undesirable shape and asperity areas and the like form. In the case of a large amount of asperity formation, there is the danger that an adverse influence is exercised on the arc discharge.

The above described melt control is also continued after the formation of the projection. The reason for this is that the tip surface of the projection 2 is also subject to a repeated change of configuration after the formation of the projection by the accumulation of tungsten atoms and by wear.

FIG. 5(b) shows one version of the overall shape of the electrode. Here, the part with the decreasing diameter 3 is formed to be more oval than spherical and the entire electrode is shaped roughly like a bullet tip. The advantage of this shape is that the thermal influence of the arc is only rarely exercised on the surface of the part with the decreasing diameter 3 as a result of its distance from the arc, and therefore, the vaporization of the tungsten on the surface of the part with a decreasing diameter 3 can be reduced.

It was described above that the projection 2 is not present in the completion of the discharge lamp and that in the course of subsequent lamp operation it forms naturally on the tip of the part with a decreasing diameter. However, the projection 2 can also be formed beforehand, for example, using the tip of the shaft 1b. In this case, as a result of the accumulation of tungsten and as a result of wear during lamp operation, a change in the configuration of the projection 1 occurs to a significant degree. Melt control in accordance with the invention is therefore effective. Especially for the electrode shown in FIG. 5(b) with a roughly oval shape with a decreasing diameter, the tungsten vaporizes only to a minor extent. Therefore, this electrode is only rarely subject to the effect of the change in the shape of the projection during operation. As a result, there is the major advantage that the high current pulse can also be reduced, or similar advantages.

As was described above, both in the case in which the projection 2 is formed beforehand and also in the case in which it is formed in the above described manner by lamp operation, it is desirable that the tip area of the projection is formed to be roughly hemispherical in order to obtain stable operation.

With respect to the invention by which the projection is formed not by lamp operation, but from the start, reference can be made to Japanese patent application 2003-33811 of the applicant.

If, during lamp operation, growth and reduction of the projection occur to a great degree, the distance between the electrodes fluctuates, by which the fluctuation of the lamp voltage is caused; this is not desirable. The applicant proposed in Japanese patent application 2002-295864 (European patent application no. 03022456.2) that, by controlling the wattage, the growth and reduction of the projection are controlled, and furthermore, proposed in Japanese patent application 2002-324780 (European patent application no. 03025112.8) that, by controlling the operating frequency, the growth and reduction of the projection are controlled.

The numerical values of the electrode are shown below by way of example.

The outside diameter of the projection 2 is 0.15 mm to 0.6 mm and is, for example, 0.3 mm;

the length of the projection 2 in the axial direction is 0.1 mm to 0.4 mm and is, for example, 0.25 mm;

the length of the part with the decreasing diameter 3 is 0.7 mm to 1.5 mm in the axial direction and is, for example, 1.0 mm;

the outside diameter of the part with the greater diameter 4 is 1.0 mm to 2.0 mm and is, for example, 1.4 mm;

the length of the part with the greater diameter 4 is 0.7 mm to 2.0 mm in the axial direction and is, for example, 1.0 mm;

the outside diameter of the shaft 1b is in the range from 0.2 mm to 0.6 mm and is for, example, 0.4 mm; and the wire diameter of the coil 4 is in the range from 0.1 mm to 0.3 mm and is, for example, 0.25 mm.

The above described numerical values relate to one example and are used especially in conjunction with the above described designed values of the discharge lamp.

In the above described embodiment, a case was described in which a projection is formed on the electrode tip. The melt control of the invention is, however, effective for stable discharge also in the case in which the above described projection is not formed, but in which the electrode tip is deformed by the deposition of tungsten in the tip area of the electrode.

Figure 6A:
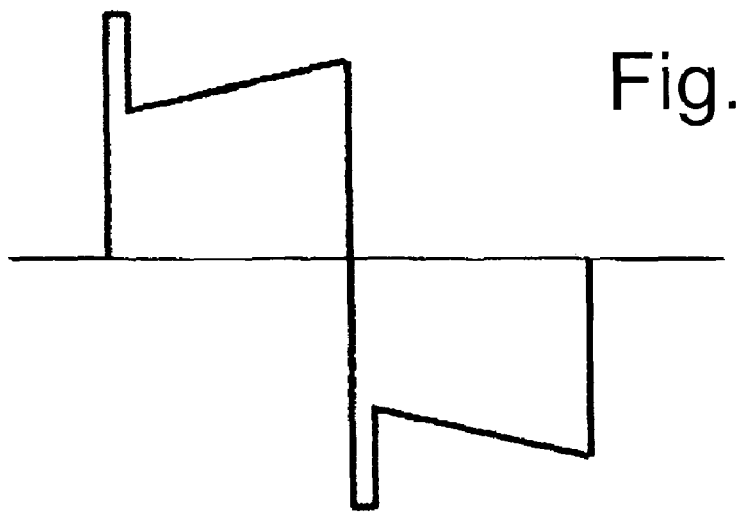
FIGS. 6(*a*) to 6(*c*) each show a plot of the current waveform of the ultra-high pressure mercury lamp in accordance with another aspect of the invention.
Figure 6B:
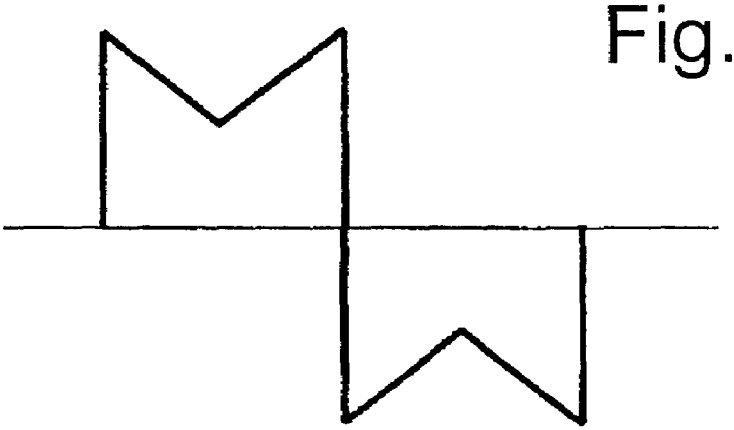
Figure 6C:
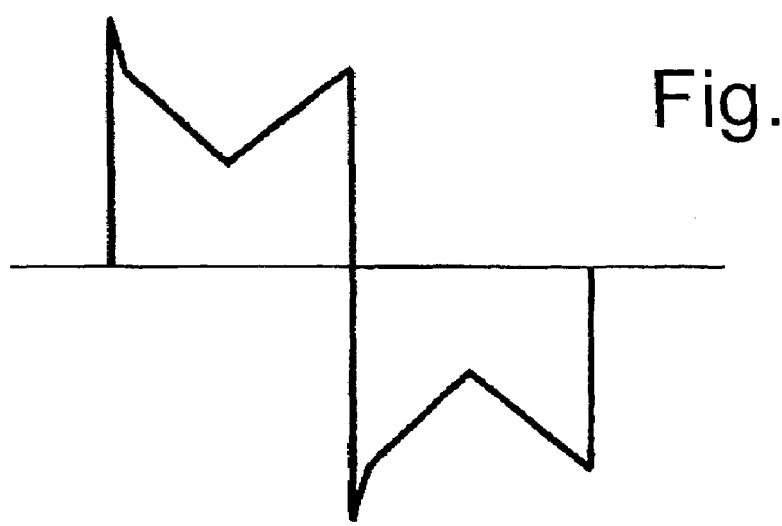

FIGS. 6(a) to 6(c) each show one version of the current waveform of the discharge lamp. The y-axis represents the current value and the x-axis plots the time in FIGS. 6(a) to 6(c), as in FIGS. 3(a) to 3(c) and FIGS. 4(a) to 4(c).

These versions are characterized in that, in addition to superposition of a high pulse current immediately after polarity switching of the alternating current, the amount of current is increased afterwards towards the last half of the half period. In this way, especially in the last half of operation of the electrode as a cathode in which the temperature drops, the electrode temperature for each half period can be increased and stable electron emission from the melt surface of the electrode tip can be carried out.

This means that, during the interval Tb, in a half period of cathode operation, the temperature of the electrode tip drops toward the last half. The discharge start point, i.e., the so-called cathode spot, therefore contracts. The location at which this contraction takes place is, however, not always constant, but there are also cases in which arc instability, such as arc spot movement or the like, takes place. Especially for a discharge lamp with a high operating pressure in which the discharge vessel is filled with a large amount of mercury, i.e., at least 0.15 mg/mm$^3$ of mercury, as in the invention, the discharge start point is contracted, by which the above described arc instability can often arise.

FIG. 6(a) shows a current waveform which gradually increases after superposition of a high pulse. The advantage of this waveform is that the surface of the electrode tip area can be melted by the high current pulse and that, moreover, the temperature increase of the electrode takes place by simple control.

FIG. 6(b) shows the current waveform in which a high current pulse is superimposed gradually decreasing and in which it gradually increases afterwards. The current waveform of the half period has an essentially M shape. The advantage of this waveform is that, not only the above described melting of the electrode tip area and the temperature increase of the electrode can be carried out, but that the two controls can be carried out without the accompaniment of an acute change of the current value, smoothly and without interruption.

FIG. 6(c) shows a current waveform in which, in addition to the M-shaped control shown in FIG. 6(b), the current value of the high pulse current is set high. The advantage of this waveform is that, as a result of the large amount of energy of the high pulse current, the melting effect of the surface of the electrode tip area is also large and that it is therefore effective when using a light control mode, especially when used with the accompaniment of a major reduction of light. The current waveform in FIG. 6(c) is characterized in that the average of the current value of the first half of the half period is greater than the average of the current value of the last half of the half period.

The current waveform for achieving the two effects, specifically the melting of the surface of the electrode tip area and the temperature increase of the electrode, is not limited to the current waveform shown above in FIG. 6(a) to 6(c), but also other current waveforms can be used.

As was described above, by the measure that, immediately after polarity switching for each half period of the alternating current, a high pulse current is superimposed and that, afterwards, toward the last half of the half period, the current value is increased, the electrode tip area can be melted, moreover the temperature of the electrode can be advantageously increased and as a result the electron emission from the same side can be stably maintained.

Figure 7A:
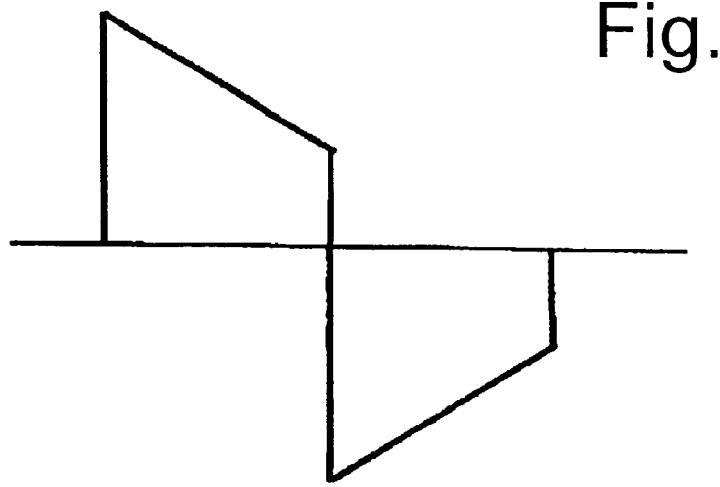
FIGS. 7(*a*) to 7(*c*) each show a plot of the current waveform of the ultra-high pressure mercury lamp according to a further aspect of the invention.
Figure 7B:
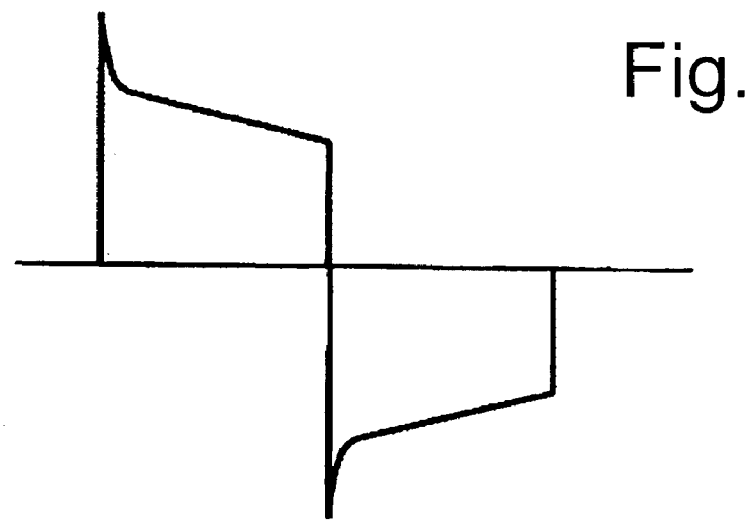
Figure 7C:
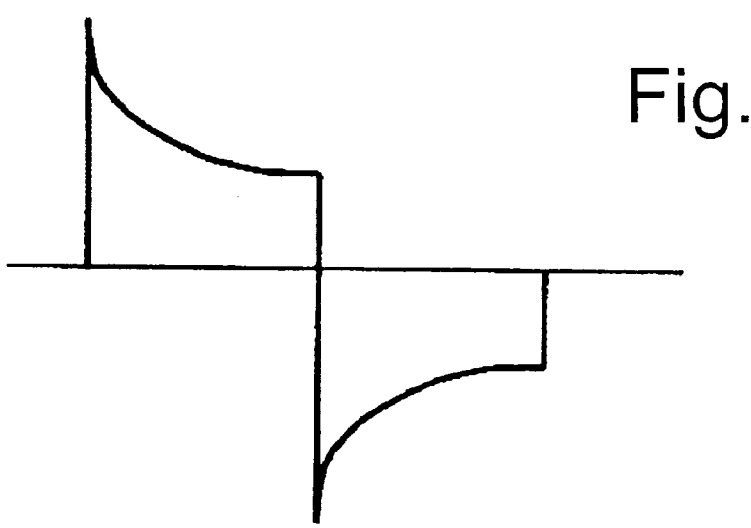

FIGS. 7(a) to 7(c) each show a version of the current waveform of the discharge lamp. In FIGS. 7(a) to 7(c), as in FIGS. 3(a) to 3(c), FIGS. 4(a) to 4(c) and FIGS. 6(a) to 6(c), the y-axis represents the current value and the x-axis represents the time.

These versions are characterized in that, immediately after polarity switching of the alternating current, a high pulse current is superimposed, and that afterwards, during the entire interval of this pulse, the amount of current is decreased.

FIGS. 7(a) and 7(b) show a current waveform which gradually decreases after superposition of a high pulse. The advantage of this waveform is that the high pressure pulse can melt the surface of the electrode tip area and that, as a result of a constant amount of reduction of the current, afterwards, control is simplified when, for example, synchronization with a DMD element or a rotary filter is attempted. FIG. 7(c) shows a waveform in which after superposition of a high pulse the amount of current is reduced in the manner of curve.

Here, in the discharge lamp of the invention, an ultra-high pressure mercury lamp is assumed in which the distance between the electrodes is at most 2 mm and in which a rare gas and a halogen amount in the range from $1\times10^{-6}$ μmole/mm$^3$ to $1\times10^{-2}$ μmole/mm$^3$ are added. Since it is a discharge lamp which has the above described arrangement, in the course of lamp operation, tungsten is deposited on the electrode tips, the electrode tips are deformed or projections are formed. Therefore, the disadvantage furthermore also arises that the shape of the projections changes, even in the case in which projections are formed from the start.

Therefore, it may be that there is a discharge lamp with electrodes with projections formed beforehand among the discharge lamps which do not have the above described arrangement and which have completely different purposes and the like. However, in such a discharge lamp, since originally there is no technical object with respect to formation and growth of projections and a change of their shape, it can be stated that this prior art has a completely different dimension than the invention.

Therefore, in accordance with the invention, in a discharge lamp with the conditions under which the shape of the electrode tip changes as a result of deposition of tungsten in the course of lamp operation, the disadvantage as a result of the change of the shape of the projections is eliminated.

Figure 8:
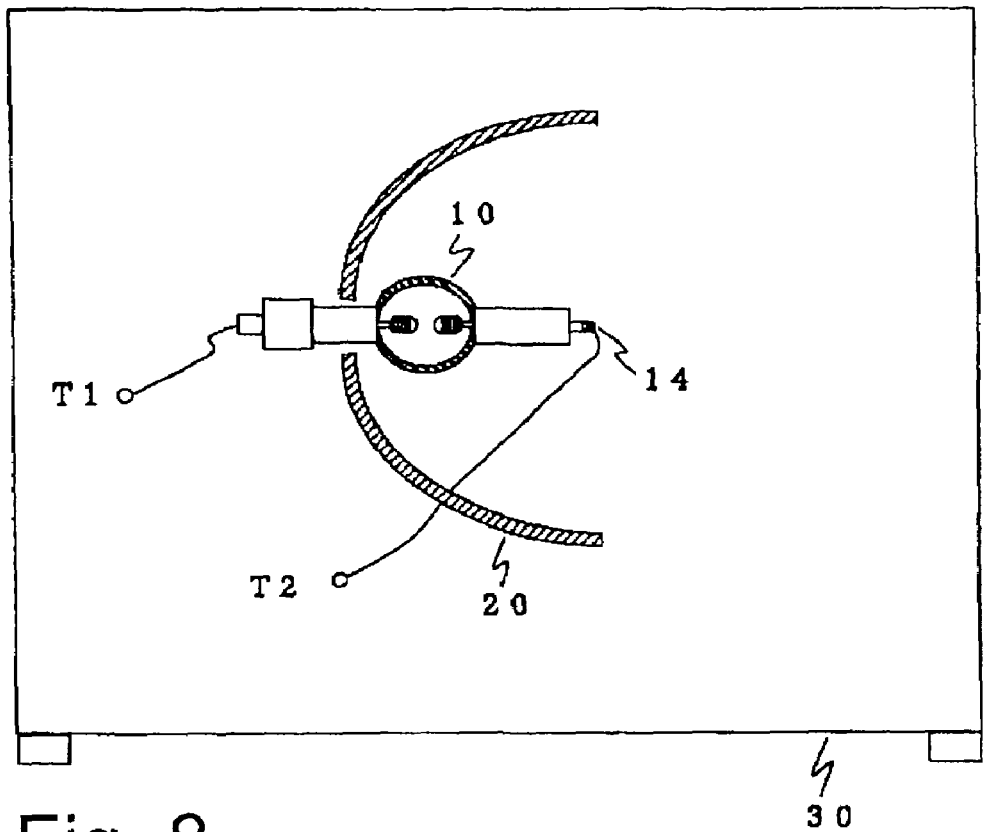
FIG. 8 is a schematic depiction of a light source device using the ultra-high pressure mercury lamp of the invention.
Figure 9:
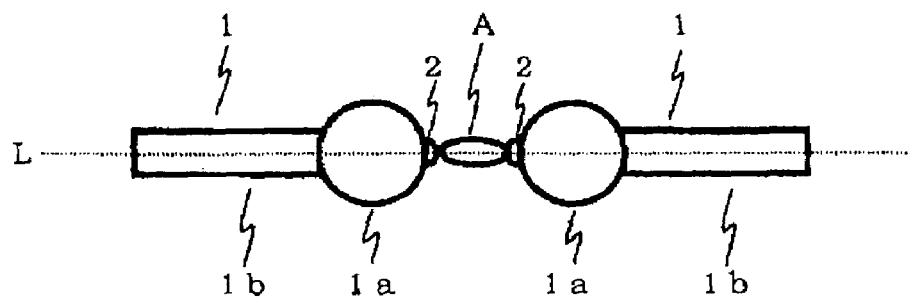
FIG. 9 is a schematic representation of the electrodes of an ultra-high pressure mercury lamp.

FIG. 8 shows the state in which the discharge lamp 10, a concave reflector 20 which surrounds this discharge lamp 10, and the combination of these two with one another (hereinafter, the combination of the discharge lamp 10 with the concave reflector 20 is called a "light source device") are installed in a projector device 30. In the projector device 30, in reality complex optical parts, electrical parts and the like are tightly arranged. FIG. 8 shows the device simplified to facilitate the description.

The discharge lamp 10 is held extending through a hole in the concave reflector 20. An operating device (not shown) is attached to the terminals T1 and T2 of the discharge lamp 10. For a concave reflector 20, an elliptical reflector or a parabolic reflector is used. The reflection surface is provided with a film which has been formed by evaporation and which reflects light with given wavelengths.

The focal position of the concave reflector 20 is designed in the arc position of the discharge lamp 10. The light of the arc spot can emerge with high efficiency through the reflector.

It is desirable for the above described electrode arrangement to be used for the two electrodes of the discharge lamp. However, it can also be used only for one of the electrodes.

ACTION OF THE INVENTION

As was described above, in the emission device of the invention, for an ultra-high pressure discharge lamp, a high pulse current is superimposed for a half period of the alternating current immediately after polarity switching. The surface of the electrode tip area of the discharge lamp is therefore shifted into the molten state at least for each switching into anode operation. In this way, formation of an undesirable shape, such as an asperity formation, on the surface of the electrode tip area or the like can be prevented.

We claim:

1. Emission device for an ultra-high pressure mercury lamp which comprises:
a short arc ultra-high pressure mercury lamp having a silica glass arc tube containing a pair of opposed electrodes that have tungsten as a main component and that are spaced apart a distance of at most 2 mm, and being filled with at least 0.15 mg/mm$^3$ of mercury, a rare gas and an amount of halogen of from $1\times10^{-6}$ μmole/mm$^3$ to $1\times10^{-2}$ μmole/mm$^3$; and
an operating device, the operating device being adapted to shift the surface of a tip area of at least one of the electrodes into a molten state during lamp operation; wherein the operating device has a means for superimposing a high pulse on the alternating lamp current immediately after polarity inversion.

2. Emission device for an ultra-high pressure mercury lamp as claimed in claim 1, wherein the operating device has an alternating lamp current supply control which increases lamp current after a high pulse toward a last half of a half-period.

3. Emission device for an ultra-high pressure mercury lamp as claimed in claim 1, wherein the operating device has an alternating lamp current supply control which gradually decreases lamp current after superposition of a high pulse and afterwards gradually increases lamp current starting wit a last half of the half period.

4. Emission device for an ultra-high pressure mercury lamp as claimed in claim 1, wherein the operating device has an alternating lamp current supply control which decreases lamp current after superposition of a high pulse during the entire interval of the half-period.

5. Emission device for an ultra-high pressure mercury lamp as claimed in claim 1, wherein at least one of the electrodes has a part formed with a greater diameter on a shaft, a projection being formed on a tip of the part with a greater diameter, and a part with a decreasing diameter which is formed extending from the part with the greater diameter in a direction toward the projection.

6. Emission device for an ultra-high pressure mercury lamp as claimed in claim 5, wherein the tip of the projection is roughly hemispherical.

7. Projector comprising a reflector, an ultra-high pressure mercury lamp mounted in the reflector and an operating device for controlling operation of the lamp, wherein:

the short arc ultra-high pressure mercury lamp has a silica glass arc tube containing a pair of opposed electrodes that have tungsten as a main component and that are spaced apart a distance of at most 2 mm, and being filled with at least 0.15 mg/mm³ of mercury, a rare gas and an amount of halogen of from $1\times10^{-6}$ μmole/mm³ to $1\times10^{-2}$ μmole/mm³; and the operating device is adapted to shift the surface of a tip area of at least one of the electrodes into a molten state during lamp operation;

wherein the operating device has a means for superimposing a high pulse on the alternating lamp current immediately after polarity inversion.

8. Projector as claimed in claim 7, wherein the operating device has an alternating lamp current supply control which increases lamp current after the high pulse toward a last half of a half-period.

9. Projector as claimed in claim 7, wherein the operating device has an alternating lamp current supply control which gradually decreases lamp current after superposition of the high pulse and afterwards gradually increases lamp current starting with a last half of the half-period.

10. Projector as claimed in claim 7, wherein the operating device has an alternating lamp current supply control which decreases lamp current after superposition of a high pulse during the entire interval of the half-period.

11. Projector as claimed in claim 7, wherein at least one of the electrodes has a part formed with a greater diameter on a shaft, a projection being formed on a lip of the part with a greater diameter, and a part with a decreasing diameter which is formed extending from the part with the greater diameter in a direction toward the projection.

12. Projector as claimed in claim 11, wherein the tip of the projection is roughly hemispherical.

\* \* \* \* \*